US005943176A

United States Patent [19]

Mertens

[11] Patent Number: 5,943,176

[45] Date of Patent: Aug. 24, 1999

[54] EXTERNAL REARVIEW MIRROR FOR VEHICLES, ESPECIALLY FOR MOTOR VEHICLES

[75] Inventor: Jens Mertens, Stuttgart, Germany

[73] Assignee: Reitter & Schefenacker GmbH & Co. KG, Esslingen, Germany

[21] Appl. No.: 08/813,617

[22] Filed: Mar. 7, 1997

[30] Foreign Application Priority Data

Mar. 8, 1996 [DE] Germany .......................... 196 09 017

[51] Int. Cl.[6] .............................. G02B 7/182; B60R 1/06

[52] U.S. Cl. .......................... 359/872; 248/479; 248/483

[58] Field of Search ..................................... 359/872, 873, 359/874, 875, 876, 877; 248/477, 478, 479, 480, 481, 483

[56] References Cited

U.S. PATENT DOCUMENTS

| | | | |
|---|---|---|---|
| 2,452,316 | 10/1948 | Morley | 248/483 |
| 4,158,483 | 6/1979 | Fisher et al. | 359/877 |
| 4,555,166 | 11/1985 | Enomoto | 359/874 |
| 4,693,571 | 9/1987 | Kimura et al. | 359/877 |
| 4,696,555 | 9/1987 | Enomoto | 359/877 |
| 4,764,004 | 8/1988 | Yamada et al. | 359/872 |
| 4,981,279 | 1/1991 | Andreas et al. | 359/872 |
| 5,363,246 | 11/1994 | Perry et al. | 248/483 |
| 5,568,326 | 10/1996 | Yoshida et al. | 359/872 |
| 5,621,577 | 4/1997 | Lang et al. | 359/872 |
| 5,629,810 | 5/1997 | Perry et al. | 359/872 |

*Primary Examiner*—Ricky D. Shafer
*Attorney, Agent, or Firm*—Robert W. Becker & Associates

[57] ABSTRACT

An external rearview mirror for motor vehicles includes a support having a spherical inner support surface and a mirror holder pivotably connected to the support. At least one guide element for supporting the mirror holder in a selected position relative to the support is provided. The at least one guide element has a curved outer surface resting at the spherical inner support surface. At least one spring for securing face-to-face the curved outer surface of the at least one guide element at the spherical inner support surface is provided.

12 Claims, 3 Drawing Sheets

1
2
3
8
9
10
11
13
14
19
20
20
21
23
23
II 1
2
13
14
17
18
18
19
23
23
23
29
29
29
30
30
30
31
31
32
II
III

EXTERNAL REARVIEW MIRROR FOR VEHICLES, ESPECIALLY FOR MOTOR VEHICLES

BACKGROUND OF THE INVENTION

The present invention relates to an external rearview mirror for vehicles, especially motor vehicles, comprising a support at the mirror housing and a mirror holder which is adjustable relative to the support and which, in an adjusted position, is supported thereat with at least one guide element that rests under the bias of at least one spring at a spherical inner support surface of the support.

In such known external rearview mirrors, the mirror holder is provided at its rear with spring arms which, under the force of a respective spring element, rest at the counter surface of the support in the form of a spherical inner surface. In order to be able to support the spring element at the guide element, a special constructive design of the guide elements is required.

In another known exterior rear view mirror guide elements are provided at the back side of the mirror holder. The guide elements are secured between the two legs of a substantially triangular spring element. This also requires a special constructive design.

It is an object of the invention to embody an exterior rearview mirror of the aforementioned kind such that it has a simple constructive design but allows for a simple adjustment and positional securing of the mirror holder relative to the support of the mirror housing.

SUMMARY OF THE INVENTION

The external rearview mirror for motor vehicles according to the present invention is primarily characterized by:

A support having a spherical inner support surface;

A mirror holder pivotably connected to the support;

At least one guide element for supporting the mirror holder in a selected position relative to the support;

The at least one guide element having a curved outer surface resting at the spherical inner support surface;

At least one spring for securing face-to-face the curved outer surface of the at least one guide element at the spherical inner support surface.

The at least one guide element preferably rests elastically deformed at the spherical inner support surface.

The at least one spring is preferably an annular spring.

Advantageously, the at least one spring is secured at the support.

The mirror holder preferably has a circular contour.

A plurality of guide elements is advantageously distributed over the circumference of the mirror holder and the curved outer surfaces of the guide elements rest at the spherical inner support surface.

The at least one guide element comprises preferably at least one transverse stay for connecting the at least one guide element to the mirror holder.

The support has a receiving member and the mirror holder has at least one bearing part secured in the receiving member.

The mirror holder has a support part and includes spring stays for connecting the support part to the at least one bearing part.

The spring stays are arranged at an angular spacing of 90° to one another.

Advantageously, the rearview mirror further comprises a ring, wherein two of the spring stays are connected diametrically opposed to one another to the exterior wall of the ring and connect the ring to the support part and wherein two of the spring stays are connected diametrically opposed to one another to an interior wall of the ring and connect the ring to the at least one bearing part. Preferably, the spring stays are arranged at an angular spacing of 90° to one another.

In the inventive exterior rearview mirror the guide element has a curved outer surface which coincides with the imaginary hollow spherical surface of the spherical inner support surface of the support. Thus, the guide element rests face-to-face or areally at the counter surface (spherical inner support surface). The spring ensures a sufficiently strong frictional connection between the guide element and the counter surface of the support so that the mirror holder, in a respective selected position, is securely held at the support and is prevented from carrying out any vibrations or oscillations. Due to the surface abutment of the guide element at the counter surface, a special constructive design of the guide element is not required.

BRIEF DESCRIPTION OF THE DRAWINGS

The object and advantages of the present invention will appear more clearly from the following specification in conjunction with the accompanying drawings, in which.

DESCRIPTION OF PREFFERED EMBODIMENTS

Figure 1:
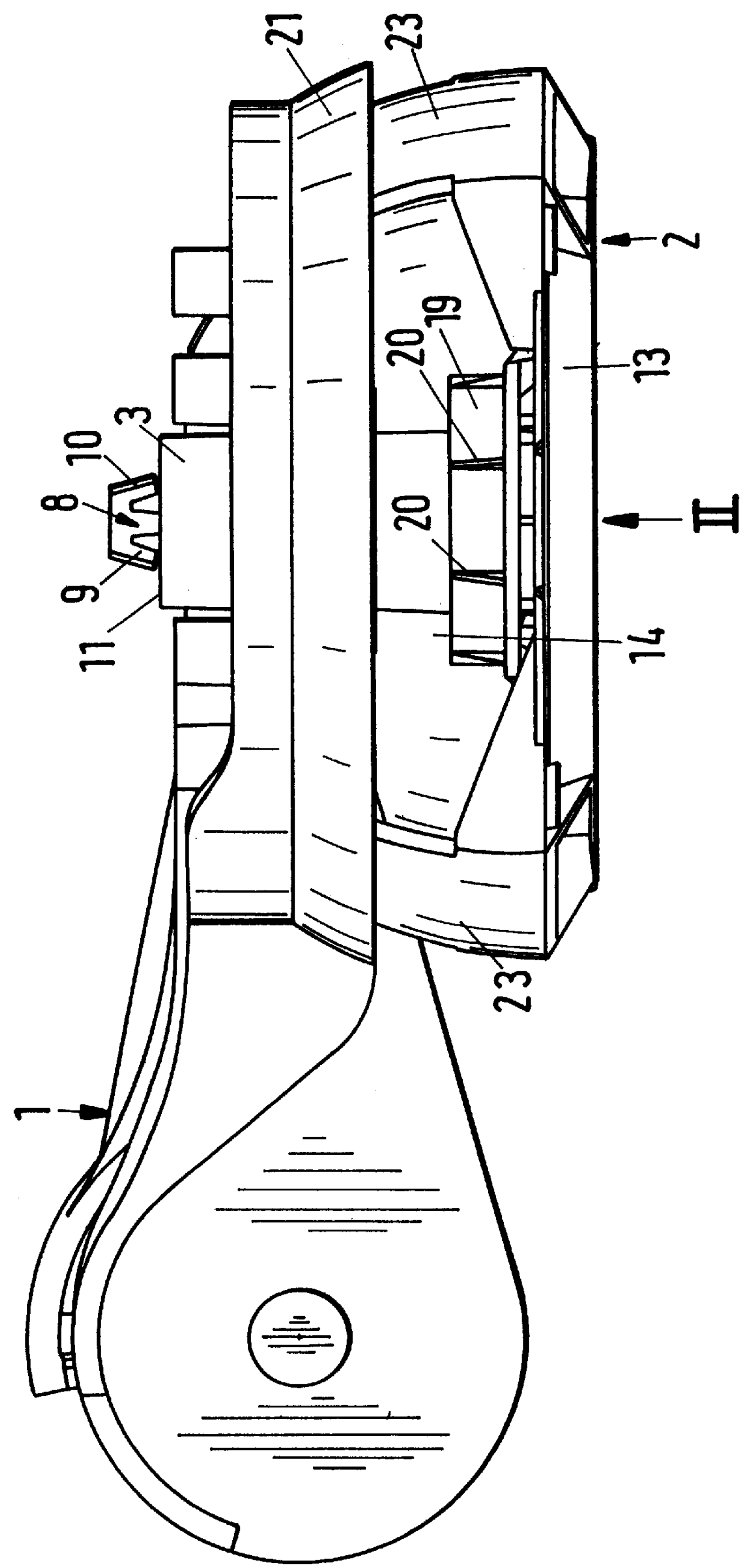
FIG. 1 is a plan view of an inventive exterior rearview mirror.
Figure 2:
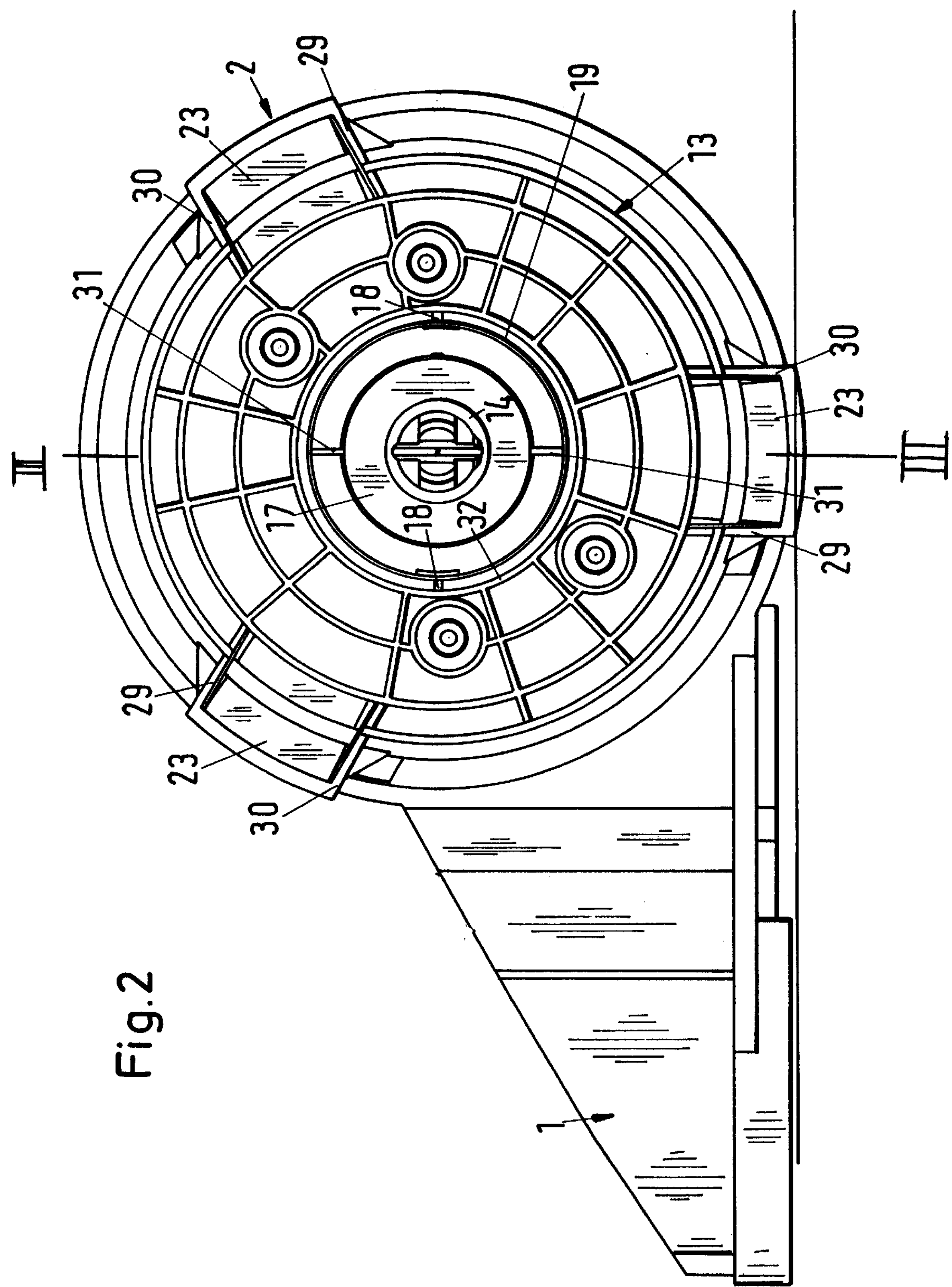
FIG. 2 is a view in the direction of arrow II in FIG. 1.

The present invention will now be described in detail with the aid of several specific embodiment utilizing FIGS. 1 through 3.

The exterior rearview mirror is designed for use in connection with motor vehicles and comprises a support 1 positioned in a non-represented mirror housing. The support 1 consists advantageously of plastic material and supports a mirror holder 2 which has connected thereto, in a manner known per se, a mirror pane (not represented). The mirror holder 2 in a plan view (FIG. 2) has a circular contour. Of course, it can have any other suitable contour, for example, a rectangular contour. The mirror holder 2 can be adjusted or displaced relative to the support 1 manually or with the aid of an electric motor.

The support 1 is provided with a receiving member 3 which projects from a base plate 4 of the support 1. As shown in FIG. 3, the inner wall 5 of the receiving member 3 is conical. The receiving member 3 has a bottom 6 which is provided with a centrally arranged insertion opening 7 which has a rectangular contour. The projection 8 with hooks (FIGS. 1 and 3) of the mirror holder 2 is inserted into the opening 7. The two hooks 9 and 10 of the projection 8 are supported in the mounted position at the underside 11 of the bottom 6 of the support 1. The hooks 9, 10 are elastically deformable. In order for the projection 8 to be insertable through the insertion opening 7 of the receiving bottom 6, the hooks 9, 10 during insertion are first elastically bent toward one another until the projection 8 can be inserted through the opening. Subsequently, the hooks 9, 10 will spread apart into the position represented in FIG. 1. They are then supported with their free ends at the underside 11 of the receiving member 3. This secures the mirror holder 2 in a simple manner at the support 1. Additional securing parts for preventing an accidental release of the mirror holder 2 are not required.

Figure 3:
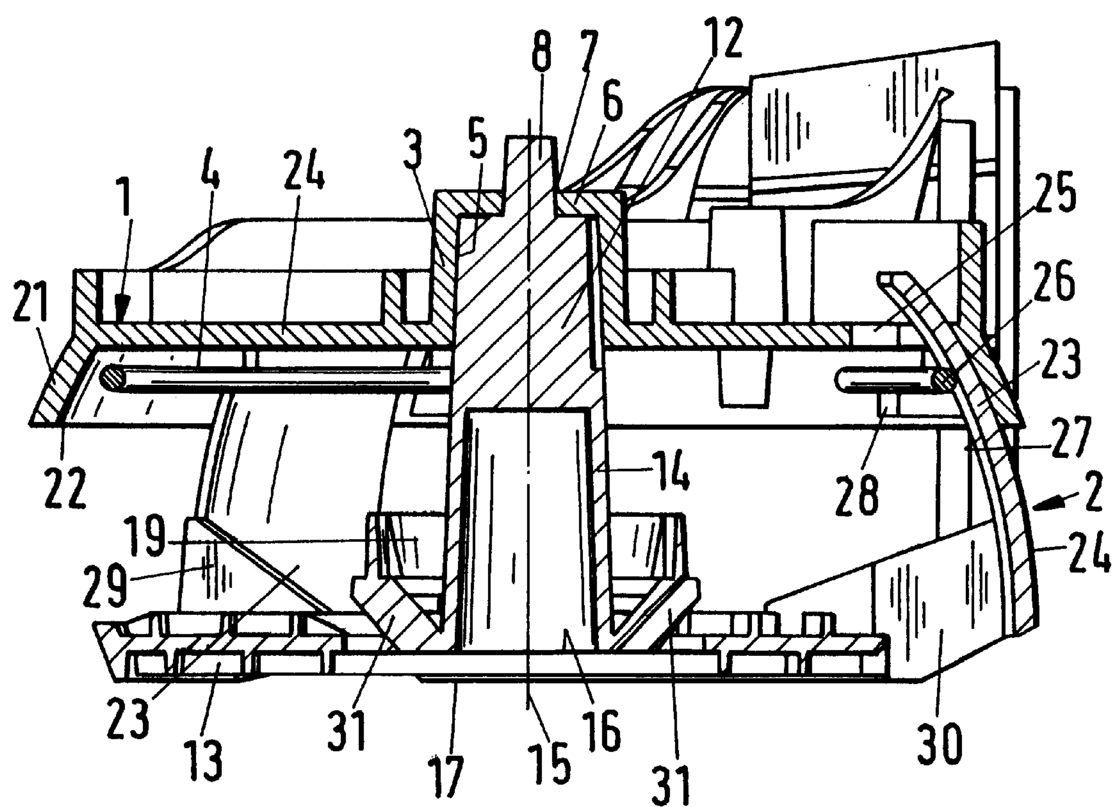
FIG. 3 is a section along the line III—III of FIG. 2.

The projection 8 which has a contour matching the contour of the insertion opening 7 projects from a bearing part 12 provided at the receiving member 3 which rests almost over its entire circumference at the inner wall 5 of the receiving member 3 (FIG. 3). Connected to the bearing part 12 is a support part 13 to which is connected the non-represented mirror pane. It includes a conical connecting portion 14 that is advantageously provided as a unitary part of the bearing part 12 and the support part 13. At the side of the connecting portion 14 facing the support 1 a flange-shaped connector 17 is provided that is preferably embodied as a unitary part of the connecting portion 14. The connector 17 has a circular circumference in the shown embodiment, however, it can have any other suitable contour. The connector 17 is connected with two diametrically oppositely arranged stays 31 (FIGS. 2 and 3) to the interior wall of a cylindrical ring 19 which extends coaxially to the bearing part 12. Distributed over the circumference of the exterior wall of the ring 19 are reinforcement ribs 20 which extend in axially planes of the ring 19. The stays 31 extend also in an axial plane of the ring 19, respectively, of the connecting portion 14 and are arranged so as to diverge in the direction toward the support 1. Advantageously, the stays 31 are a unitary part of the connector 17 and the ring 19.

The stays 31 are bending stays which allow for a movement of the mirror holder 2 relative to the support 1.

The ring 19 is connected with diametrically oppositely arranged stays 18 to the support part 13. The stays 18 are connected to the exterior wall of the ring 19 and extend in an axial plane of the ring 19, respectively, the connecting part 14. Viewed in the axial direction 15, the stays 18 have an angular distance of 90° relative to the stays 31. The support part 13 comprises a central recess 32 (FIG. 2) in which the connector 17 is positioned. The connector 17 has a smaller diameter than the recess 32. The stays 18 are also embodied as bending stays and are flush with the edge of the recess 32.

Since the stays 18, 31 are positioned at an angular distance of 90° relative to one another, the mirror holder 2 can be positioned in any desired position relative to the support 1 and the stays 18, 31 are correspondingly elastically deformed.

The ring 19 surrounds the connecting portion 14 over a portion of its length at a distance (FIG. 3). Via stays 18, 31 and ring 19, which is positioned between the support part 13 and the support 1, the mirror holder 2 is thus connected in a universal joint-type arrangement to the support 1 so that it can be simply moved or displaced into the desired position. The flat stays 18, 31 are then elastically bent transverse to their plane.

The support 1 comprises a widening annular receiving recess 21 on a side thereof facing the mirror holder 2. It has an inner side 22 that is curved in cross-section and serves as a guide or inner support surface for the guide elements 23 projecting from the support part 13 of the mirror holder 2. The guide elements 23 are flap-shaped and have a curved outer surface 24 (FIG. 3) with which they rest areally (face-to-face) at the spherical inner support surface 22 of the receiving recess 21. The guide elements 23 are thin-walled. Advantageously, they rest at least with a slight elastic deformation at the spherical inner support surface 22 of the receiving recess 21. The receiving recess 21, as shown in FIG. 3, has a bottom 24 which in the area of the guide elements 23 has a respective cutout 25. The guide elements 23 project through the cutouts 25.

Due to the self-tensioning of the guide elements 23 between the support 1 and the mirror holder 2 a frictional force is generated which secures the mirror holder 2 in a respectively adjusted position relative to the support 1. For increasing the frictional force, the guide elements 23 are additionally biased by a pressure force against the inner support surface 22 of the receiving recess 21. For this purpose, an annular spring 26 is provided (FIG. 3) which rests under elastic prestress at the inner side 27 of the guide elements 23. For securing the position of the spring 26, the receiving recess 21 has at least one stay 28 extending in the circumferential direction on which the annular spring 26 rests over a portion of its circumference. Advantageously, a plurality of such radially projecting stays 28 are provided in the circumferential direction of the receiving recess 21 so that a secure positioning of the annular spring is ensured. The prestress of the annular spring 26 is selected such that the guide elements 23 are tightly forced against the inner support surface 22 of the receiving recess 21 so that the mirror holder 2 in any selected position is not likely to vibrate.

Since the annular spring 26 is secured in its position, during displacement of the mirror holder 2 the guide elements 23 do not move relative to the annular spring 26. This ensures that the guide elements 23 are always fixedly forced against the inner support surface 22 of the receiving recess 21.

The guide elements 23 are arranged with radial spacing to the support part 13 and are connected thereto with stays 29, 30 (FIG. 2) extending perpendicularly to the support 1. Since the stays 29, 30 extend perpendicularly to the support part 13 as well as to the guide elements 23, the guide elements 23 are optimally connected to the support part 13. As shown in FIG. 2, the stays 29, 30 are positioned at the lateral sides (in the circumferential direction) at each guide element 23 and parallel to a radial line extending from the support part 13. The guide elements 23, in the direction toward the support 1, project with more than half their length past the stays 29, 30. The guide elements 23 are, of course, of such a length that the mirror holder 2 can be adjusted into any desired position relative to the support 1 so that a sufficient guiding at the inner support surface 22 of the receiving recess 21 is ensured. The curved outer surface 24 of the guide elements 23 is positioned on an imaginary spherical surface that is common also to the inner support surface 22 of the receiving recess 21.

The present invention is, of course, in no way restricted to the specific disclosure of the specification and drawings, but also encompasses any modifications within the scope of the appended claims.

What I claim is:

1. An external rearview mirror for motor vehicles, said rearview mirror comprising:

a support having a spherical inner support surface;

a mirror holder pivotably connected to said support;

at least one guide element for supporting said mirror holder in a selected position relative to said support;

said at least one guide element having a curved outer surface resting at said spherical inner support surface;

at least one spring for securing face-to-face said curved outer surface of said at least one guide element at said spherical inner support surface;

said at least one guide element having an inner side and said at least one spring resting directly at said inner side of said at least one guide element;

spring stays connecting said mirror holder and said support to one another, said spring stays forming an universal joint arrangement between said mirror holder and said support.

2. A rearview mirror according to claim 1, wherein said at least one guide element rests elastically deformed at said spherical inner support surface.

3. A rearview mirror according to claim 1, wherein said at least one spring is an annular spring.

4. A rearview mirror according to claim 1, wherein said at least one spring is secured at said support.

5. A rearview mirror according to claim 1, wherein said mirror holder has a circular contour.

6. A rearview mirror according to claim 5, wherein a plurality of said guide elements are distributed over a circumference of said mirror holder and wherein the curved outer surfaces of said guide elements rest at said spherical inner support surface.

7. A rearview mirror according to claim 1, wherein said at least one guide element comprises at least one transverse stay for connecting said at least one guide element to said mirror holder.

8. A rearview mirror according to claim 1, wherein said support has a receiving member and wherein said mirror holder has at least one bearing part secured in said receiving member.

9. A rearview mirror according to claim 8, wherein said mirror holder has a support part and wherein said spring stays are connected to said support part and to said at least one bearing part.

10. A rearview mirror according to claim 9, wherein said spring stays are arranged at an angular spacing of 90° to one another.

11. A rearview mirror for motor vehicles, said rearview mirror comprising:

a support having a spherical inner support surface;

a mirror holder pivotably connected to said support;

at least one guide element for supporting said mirror holder in a selected position relative to said support;

said at least one guide element having a curved outer surface resting at said spherical inner support surface;

at least one spring for securing face-to-face said curved outer surface of said at least one guide element at said spherical inner support surface;

said support having a receiving member and said mirror holder having at least one bearing part secured in said receiving member;

said mirror holder having a support part and including spring stays for connecting said support part to said at least one bearing part;

a ring having an exterior wall and an interior wall, wherein two of said spring stays are connected diametrically opposed to one another to said exterior wall and connects said ring to said support part and wherein two of said spring stays are connected diametrically opposed to one another to said interior wall and connects said ring to said at least one bearing part.

12. A rearview mirror according to claim 11, wherein said spring stays are arranged at an angular spacing of 90° to one another.

* * * * *